US012570361B2

(12) United States Patent
Vaupel et al.

(10) Patent No.: US 12,570,361 B2
(45) Date of Patent: Mar. 10, 2026

(54) PROFILED STRIP WITH A WATER DRAINAGE ELEMENT

(71) Applicant: ELKAMET KUNSTSTOFFTECHNIK GMBH, Biedenkopf (DE)

(72) Inventors: Yannik Vaupel, Dautphetal (DE); Dirk Kunkel, Bad Berleburg (DE); David Landeck, Bad Berleburg (DE); Timo Schneider, Angelburg (DE)

(73) Assignee: ELKAMET KUNSTSTOFFTECHNIK GMBH, Biedenkopf (DE)

( * ) Notice: Subject to any disclaimer, the term of this patent is extended or adjusted under 35 U.S.C. 154(b) by 397 days.

(21) Appl. No.: 18/042,781

(22) PCT Filed: Nov. 23, 2021

(86) PCT No.: PCT/DE2021/100925
§ 371 (c)(1),
(2) Date: Feb. 24, 2023

(87) PCT Pub. No.: WO2022/111760
PCT Pub. Date: Jun. 2, 2022

(65) Prior Publication Data
US 2024/0010060 A1 Jan. 11, 2024

(30) Foreign Application Priority Data
Nov. 30, 2020 (DE) .................... 10 2020 131 603.8

(51) Int. Cl.
*B62D 25/08* (2006.01)
*B60J 10/25* (2016.01)
(Continued)

(52) U.S. Cl.
CPC ............ *B62D 25/081* (2013.01); *B60J 10/25* (2016.02); *B60J 10/32* (2016.02); *B60J 10/70* (2016.02)

(58) Field of Classification Search
CPC ... B60J 10/70; B60J 10/25; B60J 10/20; B60J 10/22; B60J 10/23; B60J 10/27; B62D 25/081
USPC ........................................ 296/84.1, 208, 192
See application file for complete search history.

(56) References Cited

U.S. PATENT DOCUMENTS 4,892,351 A * 1/1990 Ono ..................... B60R 13/0212
296/213
6,769,700 B2 8/2004 Ortmuller et al.
(Continued)

FOREIGN PATENT DOCUMENTS

DE 202008009712 U1 12/2008
DE 202008006986 U1 11/2009
(Continued)

OTHER PUBLICATIONS

EP1870272 Text (Year: 2012).*
JP20001090979 Text (Year: 2001).*
FR3094282 Text (Year: 2020).*

*Primary Examiner* — Dennis H Pedder
(74) *Attorney, Agent, or Firm* — LEYDIG, VOIT & MAYER, LTD.

(57) ABSTRACT
A profiled strip for connecting a windshield of a motor vehicle to a cowl plenum cover includes an attachment portion, a latching portion and a water drainage element. The attachment portion is connectable to the windshield and has an attachment side facing the windshield and an underside facing away from the windshield. The latching portion has a latching groove configured to latchingly receive a rib of the cowl plenum cover and has an outside facing away from the latching groove. The latching groove is bounded by an inner
(Continued)

leg adjacent the attachment portion, an outer leg opposite the inner leg, and a bottom portion connecting the inner and outer legs. The water drainage element is disposed on the latching portion in a section along a longitudinal extent of the profiled strip.

19 Claims, 10 Drawing Sheets

(51) Int. Cl.
    *B60J 10/32*         (2016.01)
    *B60J 10/70*         (2016.01)

(56)              References Cited

U.S. PATENT DOCUMENTS 8,991,893 B2 *   3/2015   Platt ......................... B60J 10/70
                                    296/93

| 10,189,336 | B2 | | 1/2019 | Dalmasso et al. | |
| 10,414,259 | B2 | | 9/2019 | Ortmuller et al. | |
| 11,505,051 | B2 | * | 11/2022 | Ortmueller | B60J 10/70 |
| 2010/0194150 | A1 | | 8/2010 | Bisnack | |
| 2012/0137594 | A1 | * | 6/2012 | Zhang | B60J 10/86 |
| | | | | | 49/476.1 |

FOREIGN PATENT DOCUMENTS

| DE | 102013003358 | A1 | | 8/2014 | |
| DE | 102017118663 | A1 | | 2/2019 | |
| EP | 1571069 | A1 | | 9/2005 | |
| EP | 1280675 | B1 | | 3/2006 | |
| EP | 1870272 | B1 | * | 12/2012 | B60J 1/1823 |
| EP | 3103665 | B1 | | 7/2019 | |
| EP | 3256339 | B1 | | 9/2019 | |
| FR | 3094282 | A1 | * | 10/2020 | B60J 10/25 |
| JP | 58067518 | A | | 4/1983 | |
| JP | 2001090979 | A | * | 4/2001 | |

* cited by examiner

PROFILED STRIP WITH A WATER DRAINAGE ELEMENT

CROSS REFERENCE TO RELATED APPLICATIONS

This application is a U.S. National Phase application under 35 U.S.C. § 371 of International Application No. PCT/DE2021/100925, filed on Nov. 23, 2021, and claims benefit to German Patent Application No. DE 10 2020 131 603.8, filed on Nov. 30, 2020. The International Application was published in German on Jun. 2, 2022 as WO 2022/ 111760 A1 under PCT Article 21(2).

FIELD

The present invention concerns a profiled strip having a water drainage element for guidance and controlled drainage of water that appears on an outside of the profiled strip or in a latching portion of the profiled strip.

BACKGROUND

Publications EP 1 280 675 B1, DE 20 2008 009 712 U1 and DE 20 2008 006 986 U1 describe profiled strips in the form of a cowl profile element having an attachment portion for attachment to a windshield and a latching portion for latchingly receiving the rib of a cowl plenum cover.

Such profiled strips are attached to the lower edge of a windshield, which is then installed into the vehicle body. There is a risk, for example, that water (e.g., rain water) running off the A-pillar may run from the lower end of the A-pillar along the outside of the cowl profile element. In this case, water will drip in an uncontrolled manner from the profile toward the engine compartment. Water may also enter the latching portion and may also drip therefrom in an uncontrolled manner into the engine compartment. In either case, there is a risk of short circuits in the electronics and sensors located in the engine compartment.

Publication EP 3 256 339 B1 provides a hole in the attachment portion of a cowl profile element for draining off water that enters between the window pane and the profiled strip. However, this does not prevent uncontrolled dripping of water from the outside of the profile.

The known profiled strips do not cause water present on the outside or in the latching portion of a profiled strip to drip off in a controlled manner.

SUMMARY

In an embodiment, the present disclosure provides a profiled strip for connecting a windshield of a motor vehicle to a cowl plenum cover. The profiled strip includes an attachment portion, a latching portion and a water drainage element. The attachment portion is connectable to the windshield and has an attachment side facing the windshield and an underside facing away from the windshield. The latching portion has a latching groove configured to latchingly receive a rib of the cowl plenum cover and has an outside facing away from the latching groove. The latching groove is bounded by an inner leg adjacent the attachment portion, an outer leg opposite the inner leg, and a bottom portion connecting the inner and outer legs. The water drainage element is disposed on the latching portion in a section along a longitudinal extent of the profiled strip.

BRIEF DESCRIPTION OF THE DRAWINGS

Subject matter of the present disclosure will be described in even greater detail below based on the exemplary figures.

All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
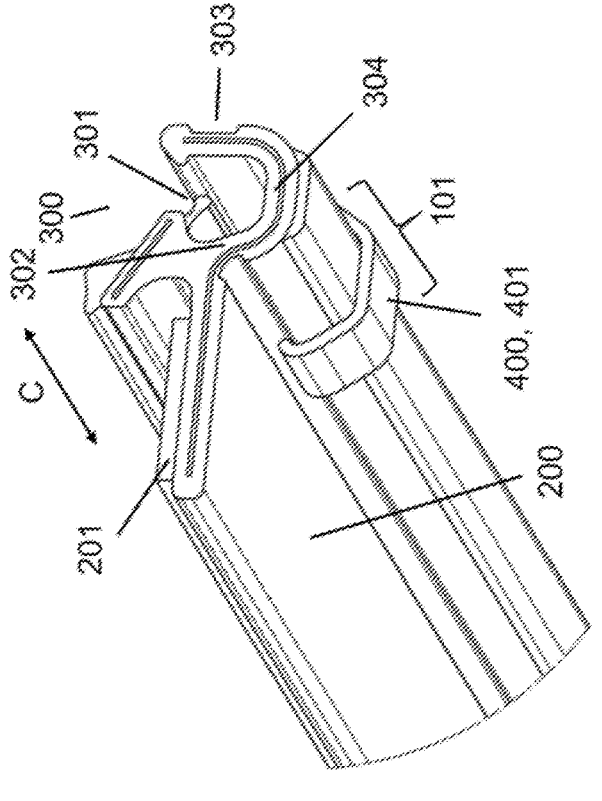
FIG. 1 is a profiled strip in an embodiment having a water drainage element in the form of an additional part.
Figure 1:
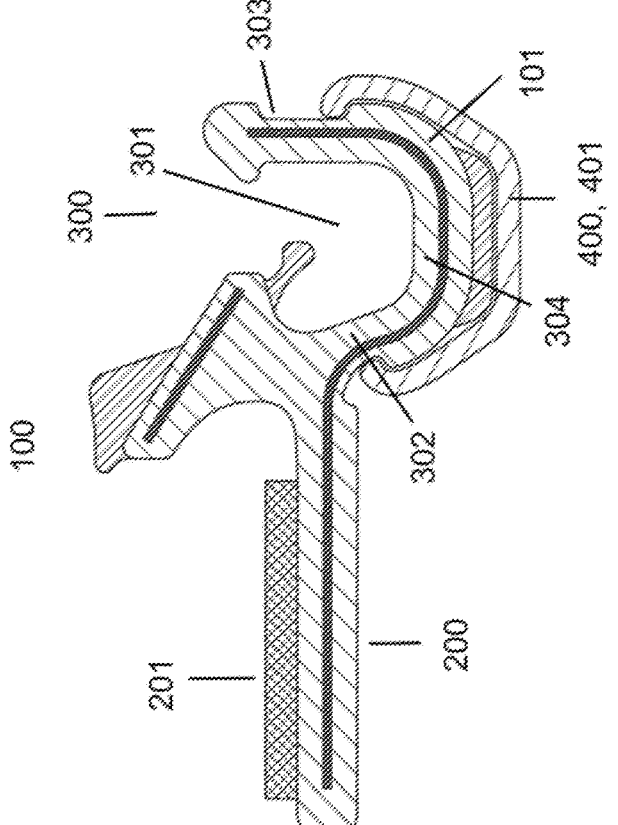

Embodiments of the present invention provide a solution to the technical problem of providing for controlled guidance and drainage of water from the latching portion or from the outside of a profiled strip. In particular, the technical problem is solved by a profiled strip including a water drainage element according to embodiments of the invention. Accordingly, embodiments of the invention provide to guide and/or drain away water that appears in the latching portion and on the outside of a profiled strip.

This is achieved by a profiled strip according to an embodiment of the present application for connecting a windshield of a motor vehicle to a cowl plenum cover, the profiled strip including an attachment portion which is connectable to the windshield and has an attachment side facing the windshield and an underside facing away from the windshield, and further including a latching portion having a latching groove for latchingly receiving a rib of the cowl plenum cover and having an outside facing away from the latching groove, the latching groove being bounded by an inner leg adjacent the attachment portion, an outer leg opposite the inner leg, and a bottom portion connecting the two legs, the profiled strip having a water drainage element which is disposed on the latching portion in a section along a longitudinal extent of the profiled strip.

In this connection, a longitudinal extent of the section as measured parallel to a longitudinal direction of the profiled strip may be less than the longitudinal extent of the profiled strip.

In an embodiment, the water drainage element is configured as an additional part disposed in the region of the section at least on a portion of the outside of the latching portion.

In another embodiment, the additional part is configured to embrace at least a portion of the latching portion, when viewed in cross section. Optionally, it may also extend over at least a portion of the underside of the attachment portion, when viewed in cross section.

In a further embodiment, the additional part has a substantially uniform cross-sectional profile along its longitudinal extent measured parallel to a longitudinal direction of the profiled strip.

In another embodiment, the additional part may also have a variable cross-sectional profile along its longitudinal extent measured parallel to the longitudinal direction of the profiled strip.

In a further embodiment, the additional part may be at least partially formed from a preferably water-repellent or water-impervious foam material.

In another embodiment, the additional part at least partially covers an opening provided in the bottom portion and/or in the outer leg of the profiled strip. In this connection, a sealing element may optionally be provided to act between the additional part and at least a portion of an edge bounding the opening.

In a further embodiment, the additional part is disposed on the profiled strip at an end face of the latching portion and may at least partially cover the latching groove, when viewed in cross section.

In the latter two embodiments, the additional part optionally has an outlet opening fluidically connected to the latching groove.

In another embodiment of the profiled strip according to the invention, the water drainage element is configured as a drain opening provided in the region of the section in the bottom portion and/or in the outer leg.

In a further embodiment, at least a portion of an edge bounding the drain opening has a drip edge projecting outwardly with respect to the latching groove.

In another embodiment, the water drainage element is configured as a material thickening which is disposed in the region of the section on the outside of the latching portion on the bottom portion and/or on the outer leg and projects outwardly with respect to the latching groove, or as a recess disposed on the bottom portion and/or on the outer leg and indented inwardly with respect to the latching groove.

Definitions:

| | |
|---|---|
| Longitudinal direction | direction of the longest dimension of the profiled strip (which corresponds to the extrusion direction in the case of extruded profiled strips); in the case of profiled strips which are curved to conform to the lower edge of a windshield, the longitudinal direction may extend along a curved line. |
| Longitudinal extent (profiled strip) | dimension of the profiled strip in the longitudinal direction |
| Section | section along the longitudinal extent of the profiled strip, where the water drainage element is disposed on the profiled strip and where water is intended to drip off or drain in a controlled manner by means of the water drainage element |
| Longitudinal extent (section) | dimension of the section as measured in a direction parallel to the longitudinal direction of the profiled strip |
| Longitudinal extent (additional part) | dimension of the additional part as measured in a direction parallel to the longitudinal direction of the profiled strip |
| Cross section | plane of section through the profiled strip and/or the additional part perpendicular to the longitudinal direction of the profile |
| Cross-sectional profile | profile of the profiled strip or of the additional part in cross section |
| Outside of the latching portion | side of the latching portion that faces away from the latching groove |
| Attachment side of the attachment portion | side of the attachment portion that serves for attachment to a windshield and may include a fastening means for the windshield, and which faces the windshield when connected thereto |

-continued

| | |
|---|---|
| Underside of the attachment portion | side of the attachment portion that faces away from the attachment side |
| Outside of the profiled strip | the outside of the profiled strip includes the outside of the latching portion and the underside of the fastening portion |
| Inner leg | leg that is located adjacent the fastening portion and constitutes a portion of the boundary of the latching groove |
| Outer leg | leg that is opposite the inner leg and constitutes a portion of the boundary of the latching groove; the outer leg is farther away from the attachment portion than the inner leg |
| Bottom portion | connecting portion between the inner leg and the outer leg |

The water drainage element according to embodiments of the invention may either be attached as an additional part to the outside of the profiled strip or be an integral part of the profiled strip and may be formed, for example, by a local opening in the latching portion or by a local contour of the outside of the latching portion. The water drainage element is disposed on the latching portion in a section along the longitudinal extent of the profiled strip, the section preferably having a smaller longitudinal extent than the profiled strip, measured parallel to the longitudinal direction of the profiled strip. This allows water to drain off in a controlled manner at a desired position along the longitudinal extent of the profiled strip. Although the term "section" is only used in the singular form hereinafter, it is possible that one section or a plurality of sections may be provided on the same profiled strip.

A profiled strip for connecting a windshield of a motor vehicle and a cowl plenum cover includes, in a known manner, an attachment portion and a latching portion. A windshield may be connected to the attachment portion of the profiled strip on the attachment side thereof by a fastening means, such as a double-sided adhesive tape. Other types of fastening are also possible.

The latching portion includes a latching groove extending in the longitudinal direction of the profiled strip. The latching groove serves to receive a latching rib of the cowl plenum cover. The latching groove is bounded toward the fastening portion by an inner leg. An outer leg is opposite the inner leg. Located between these two legs is a bottom portion, which interconnects the two legs and together therewith forms the latching groove. In the case of a V-shaped latching groove, the bottom portion constitutes the region where the inner leg and the outer leg meet. A latching element for preferably latching engagement with the rib of the cowl plenum cover may be disposed in the latching groove. Alternatively or additionally, a latching connection of the rib may also be effected by one or more undercuts on one or both legs.

The attachment portion and the latching portion of the profiled strip are preferably integrally connected as one piece. The profiled strip is preferably made of a plastic material and may preferably be manufactured in an extrusion process. Furthermore, the profiled strip may contain reinforcements, preferably of a metal or alloy.

The profiled strip according to an embodiment of the invention further includes the water drainage element, which is disposed on the latching portion in the section of the profiled strip, and which may be in the form of an, in particular local, contour in the outside region of the latching portion, a drain opening provided in the bottom portion and/or in the outer leg, or an additional part disposed on the latching portion.

The longitudinal extent of the section as measured parallel to the longitudinal direction of the profiled strip is preferably less than the longitudinal extent of the profiled strip. The longitudinal extent of the section is preferably 10%, 5%, 3%, 2%, and particularly preferably 1% of the longitudinal extent of the profiled strip.

In an embodiment, the water drainage element is an additional part which is disposed in the region of the section of the profiled strip at least on a portion of the outside of the latching portion of the profiled strip, and which is preferably frictionally and/or interlockingly connected to the profiled strip. Also conceivable is an attachment by adhesive or material-to-material bonding. This allows the profiled strip and the water drainage element to be easily manufactured separately in methods which can be optimized independently of each other. The additional part is manufactured separately from the profiled strip. After its manufacture, the additional part is mounted on the profiled strip, for example by a clipped connection.

The material of the additional part is preferably composed of plastic and may be identical to a material of the profiled strip. However, the plastic may also be different therefrom and may, for example, be harder or softer (higher or lower Shore hardness) than the plastic of the profiled strip or of a portion thereof.

The additional part embraces at least a portion of the outside of the latching portion, when viewed in cross section. Optionally, the additional part may additionally extend over at least a portion of the underside of the attachment portion, when viewed in cross section. This makes it possible to improve the attachment of the additional part to the profiled strip as compared to a crosswise extent that covers only the latching portion.

Such an additional part, for example, in the form of a clip, may have a substantially uniform cross-sectional profile along its longitudinal extent. Accordingly, the diameter or the material thickness of the additional part is substantially uniform along the longitudinal extent. The longitudinal extent of the additional part refers to its dimension in a direction parallel to the longitudinal direction of the profiled strip. This allows the additional part to be manufactured in a simple manner, for example, by extrusion and subsequent cutting into sections of desired length.

Alternatively, the additional part may have a variable cross-sectional profile along its longitudinal extent. In that case, such an additional part has different material thicknesses along its longitudinal extent. This makes it possible to force the detachment of water drops in a selected region of the additional part by configuring the contour such that, for example, a drip edge or a drip point is formed.

Furthermore, the additional part may be made partially or entirely of a preferably water-repellent or water-impervious foam material. In this case, the attachment to the outside of the profiled strip may also be effected by a material-to-material bond. In this connection, the foam material embraces at least a portion of the outside of the latching portion. In addition, the foam material may also extend along a portion or the entire underside of the attachment portion.

The additional part may be disposed in the region of a local opening of the outer leg and/or of the bottom portion and may embrace at least a portion of the outside of the latching portion, when viewed in cross section, thereby at least partially, preferably substantially, covering the opening. In this connection, a sealing element may be provided to act between the additional part and at least a portion of an edge bounding the opening. The opening may be formed by punching, drilling, milling, cutting, or the like. This allows water present in the latching groove to drain off in a controlled manner.

The additional part may alternatively also be disposed at an end face of the latching portion; i.e., in the region of an end of the profiled strip delimiting the longitudinal extent of the profiled strip. Similarly, it is also possible to dispose two such additional parts at the two end faces of the latching portion. Here, the additional part may, for example, be slipped externally onto the end. This additional part is dimensioned such that it at least partially, preferably completely, covers the latching groove, when viewed in cross section.

In the two aforementioned embodiments, there may optionally be provided an outlet opening in the form of, for example, a spout or nozzle and fluidically connected to the latching groove A profiled strip according to embodiments of the invention may also include more than one of the aforedescribed additional parts. In addition, it is also possible that a plurality of additional parts of different embodiments may be disposed on a profiled strip according to embodiments of the invention. For example, one or two additional parts disposed at one or two end faces of the latching portion may be combined with one or more additional parts along the longitudinal extent of the profiled strip. Overall, the use of one additional part does not exclude the use of another additional part; rather, this is left to the discretion of those skilled in the art.

The water drainage element may also be an integral part of the profiled strip. This eliminates the need for additional elements which would have to be manufactured separately and attached to the profiled strip.

Therefore, in another embodiment of the invention, the water drainage element is configured as a drain opening which is provided in the region of the section in the latching portion, and which locally opens the latching groove in this region. The drain opening may be formed in the outer leg and/or in the bottom portion. The drain opening may be formed by punching, drilling, milling, cutting, or the like. The drain opening may serve both for draining water in a controlled manner from the latching groove and for causing water that runs along the outside of the profiled strip to drip off in a controlled manner.

In a further embodiment, at least a portion of an edge bounding the drain opening has a drip edge projecting outwardly with respect to the latching groove. The drain opening and the projecting drip edge may be formed together in a combined punching and crimping process. Preferably, such drip edges are provided in two boundary regions of the drain opening which are located opposite each other in the longitudinal direction of the profiled strip.

In a further embodiment of the profiled strip according to the invention, the water drainage element is a local recess in the material or a local material thickening provided in the region of the section of the profiled strip on the outside of the latching portion. For example, a material thickening directed outwardly with respect to the latching groove may be provided on the outer leg and/or on the bottom portion of the latching portion. Alternatively, a recess indented inwardly with respect to the latching groove may be provided on the outer leg and/or on the bottom portion of the latching portion. In this connection, contour edges of the material thickening or of the recess cause water to drip off in a controlled manner from the outside of the profile.

The recess in the material or the material thickening may preferably be located at the lowest point of the profiled strip in the installed state, when viewed in cross section. The installed state is when the profiled strip is attached to a windshield mounted in a vehicle. In this installed state, the profiled strip is inclined at an angle. Then, a cross section of the profiled strip, shown on the left in FIG. 1, is rotated clockwise by 30°. The lowest point of the profile, when viewed in cross section, is then located in the region of the outer leg and/or in the region of the bottom portion and/or in the transition region between the outer leg and the bottom portion.

All of the aforementioned embodiments of water drainage elements, both those in the form of an additional part and those in the form of recesses and/or material thickenings and/or drain openings, may be combined with each other in a given profiled strip. Accordingly, in this case, a given profiled strip features a plurality of sections which each have a longitudinal extent less than the longitudinal extent of the profiled strip.

The profiled strip according to embodiments of the invention including a water drainage element is used to guide and/or drain away water that appears on or in the profiled strip. Such water may, for example, appear on the outside of a profiled strip or be present in the profiled strip.

A method for guiding and/or draining away water that appears on or in a profiled strip includes at least the steps of:

a) providing a profiled strip according to an embodiment of the invention, b) connecting an attachment portion of the profiled strip to a windshield.

If the additional part is used as the water drainage element, method step a) may include the steps of providing a profiled strip, providing the water drainage element in the form of an additional part, and disposing the water drainage element in the section of the profiled strip and at least a portion of the outside of the latching portion of the profiled strip.

Moreover, the method according to an embodiment of the invention includes the steps of:

c) installing the windshield with the profiled strip into a vehicle body, d) connecting the cowl plenum cover to the profiled strip.

Several non-limiting exemplary embodiments are shown in the drawings and described below.

Figure 8:
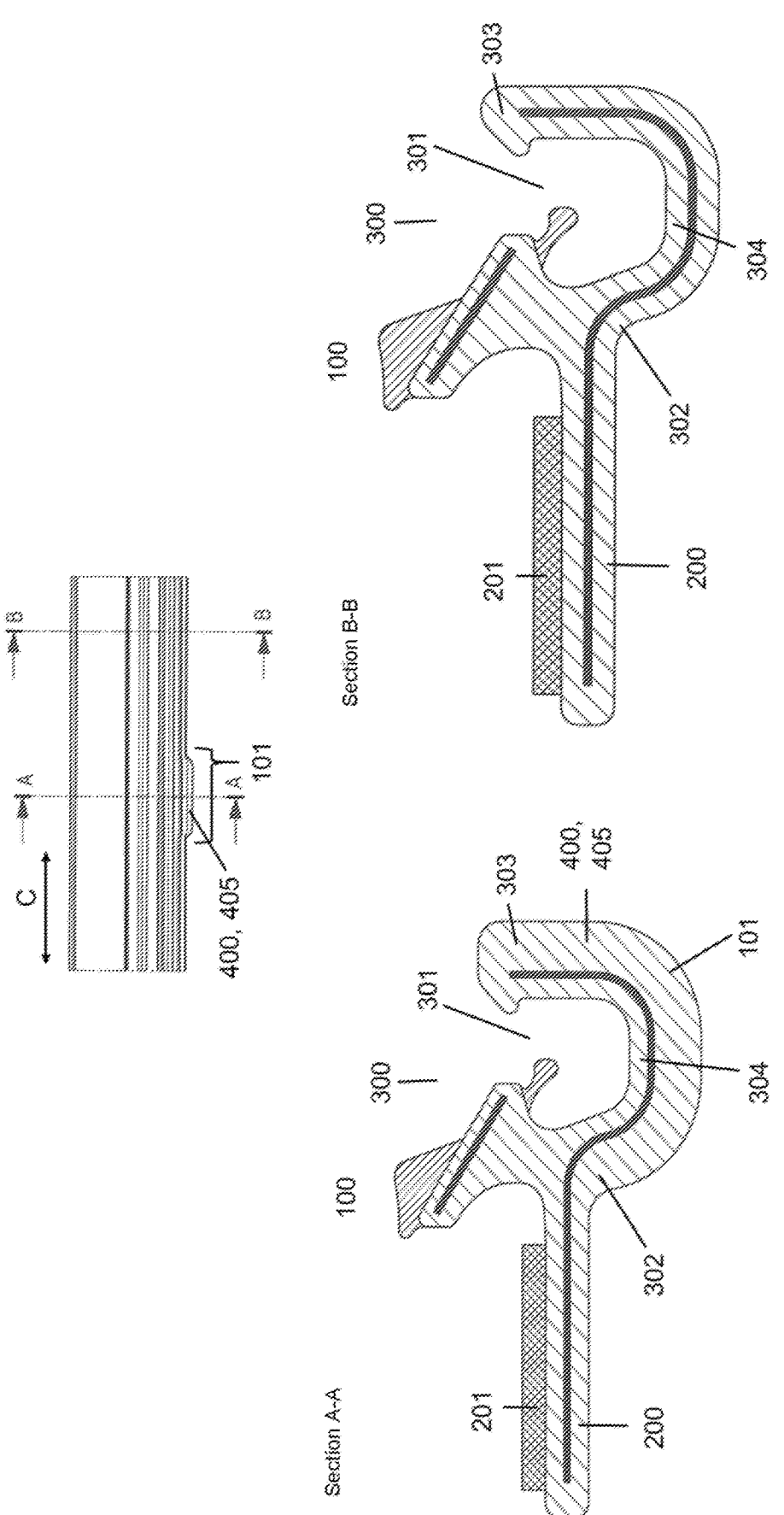
FIG. 8 is a profiled strip in an another embodiment having a water drainage element in the form of a local material thickening.
Figure 9:
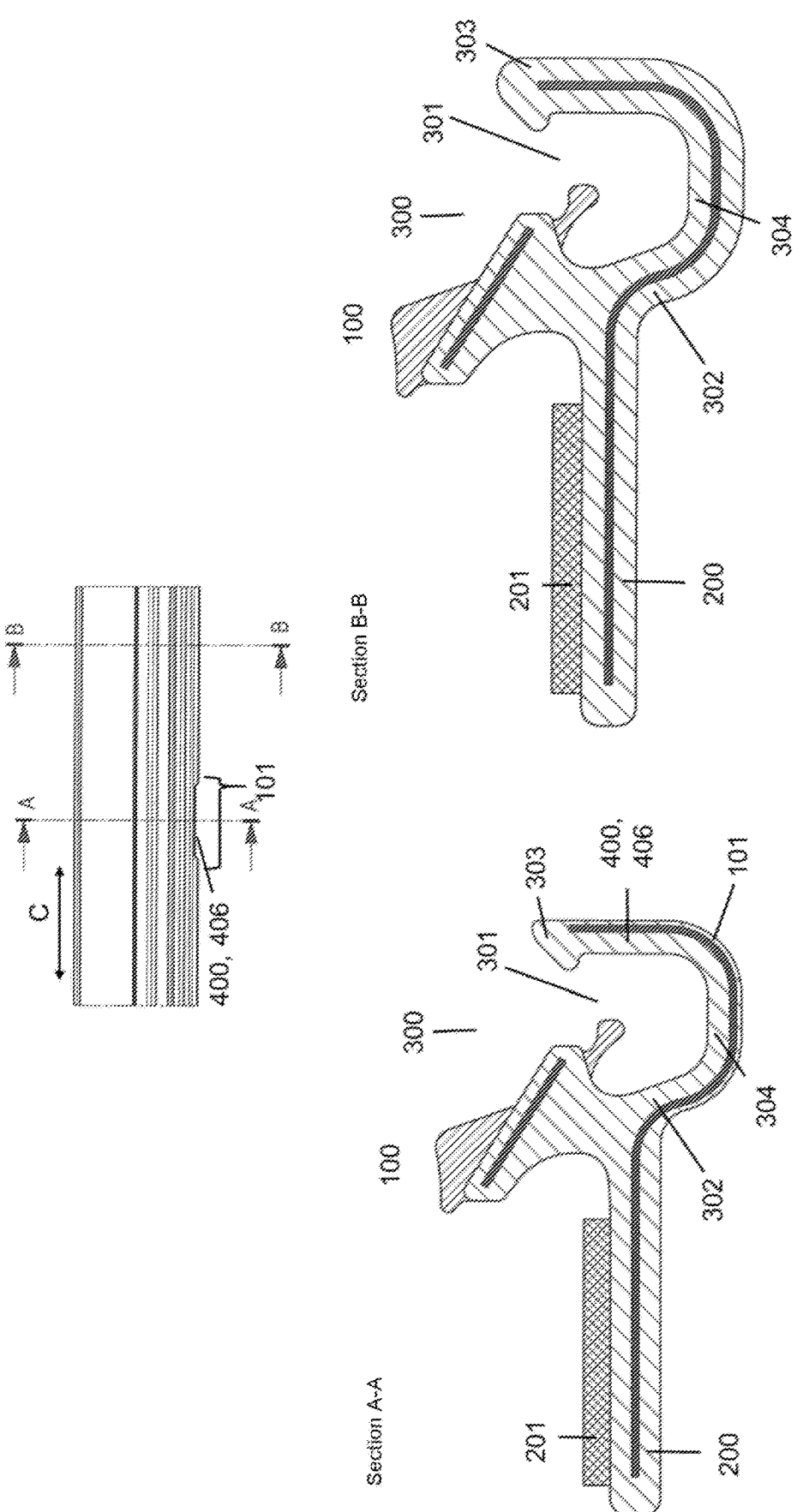
FIG. 9 is a profiled strip in an another embodiment having a water drainage element in the form of a local recess.

The figures each show a profiled strip (100) including an attachment portion (200) having a fastening means (201) for connection to a windshield and a latching portion (300) for latching connection to a cowl plenum cover. Latching portion (300) includes a latching groove (301) which extends in the longitudinal direction (C) of profiled strip (100), and in which can latchingly engage a rib of the cowl plenum cover, the latching groove (301) being bounded by an inner leg (302) adjacent the attachment portion (200), an outer leg (303) opposite the inner leg (302), and a bottom portion (304) between the two legs (302, 303). Profiled strip (100) has a section (101) along its longitudinal extent. FIGS. 1 through 6b show water drainage elements (400) in the form of an additional part (401) disposed on profiled strip (100) in the region of section (101). FIGS. 7 through 9 show water drainage elements (400) as integral parts of profiled strip (100) in the region of the respective section (101) of profiled strip (100).

FIG. 1 shows a water drainage element (400) in the form of an additional part (401) which is disposed in the region of section (101) of profiled strip (100) on the outside of latching portion (300) of profiled strip (100). Additional part (401) embraces at least a portion of the outside of latching portion (300), when viewed in cross section, and has a uniform cross-sectional profile along its longitudinal extent.

Figure 2:
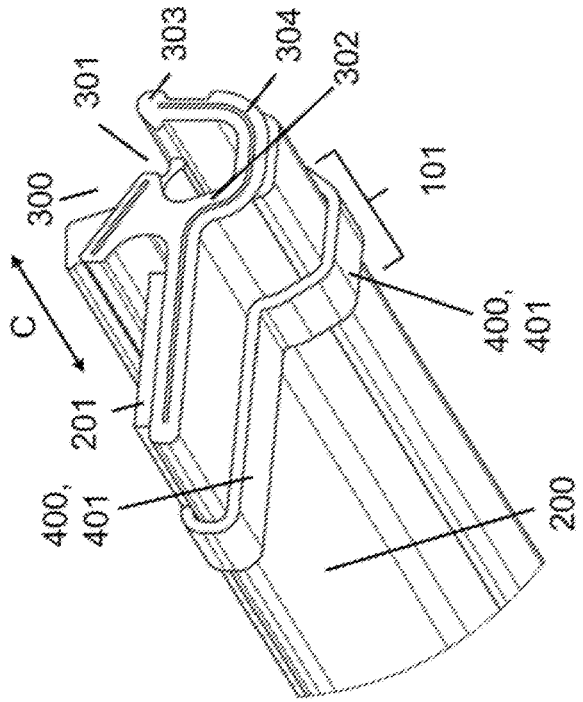
FIG. 2 is a profiled strip in an another embodiment having a water drainage element in the form of an additional part.
Figure 2:
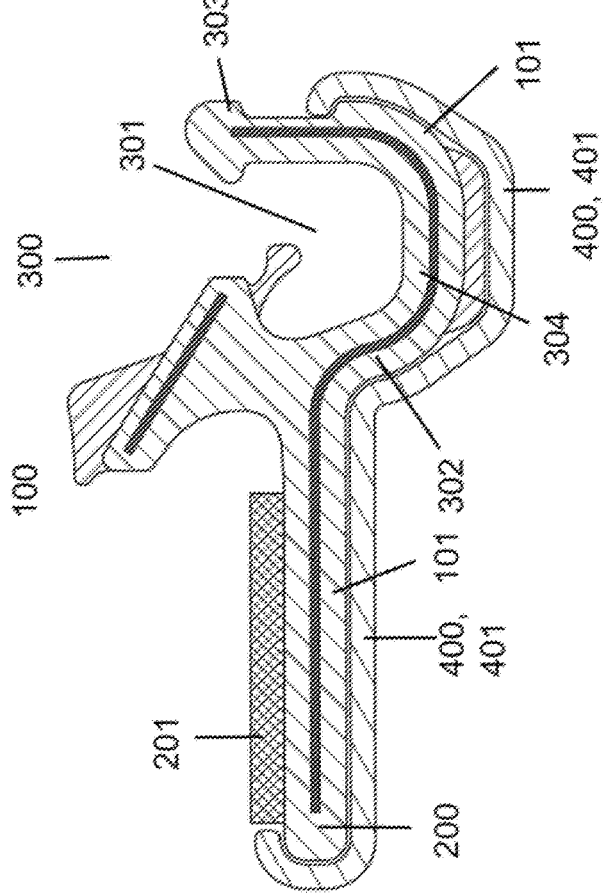

The water drainage element (400) shown in FIG. 2 is also disposed as an additional part (401) in the region of section (101) of profiled strip (100) on the outside of profiled strip (100). This additional part (401) has a uniform cross-sectional profile along its longitudinal extent and, when viewed in cross section, extends along a portion of the outside of latching portion (300) and, in addition, along the underside of attachment portion (200).

Figure 3:
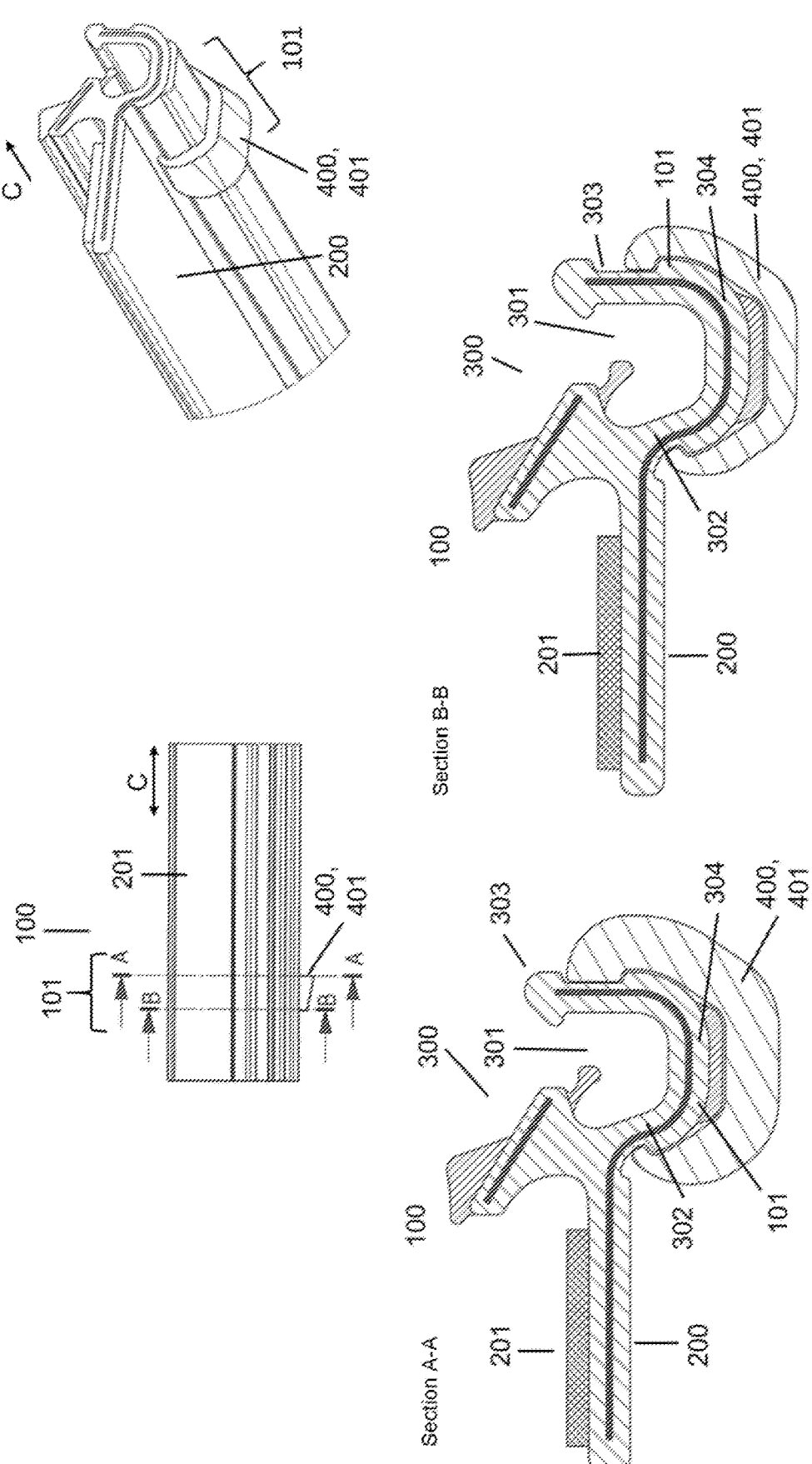
FIG. 3 is a profiled strip in an another embodiment having a water drainage element in the form of an additional part.

The water drainage element (400) shown in FIG. 3 is disposed as an additional part (401) in the region of section (101) on the outside of latching portion (300) of profiled strip (100) and embraces at least a portion of the outside of latching portion (300), when viewed in cross section. This additional part (401) has a variable cross-sectional profile along its longitudinal extent. In section A-A of FIG. 3, additional part (401) has a greater material thickness than in section B-B of FIG. 3.

Figure 4:
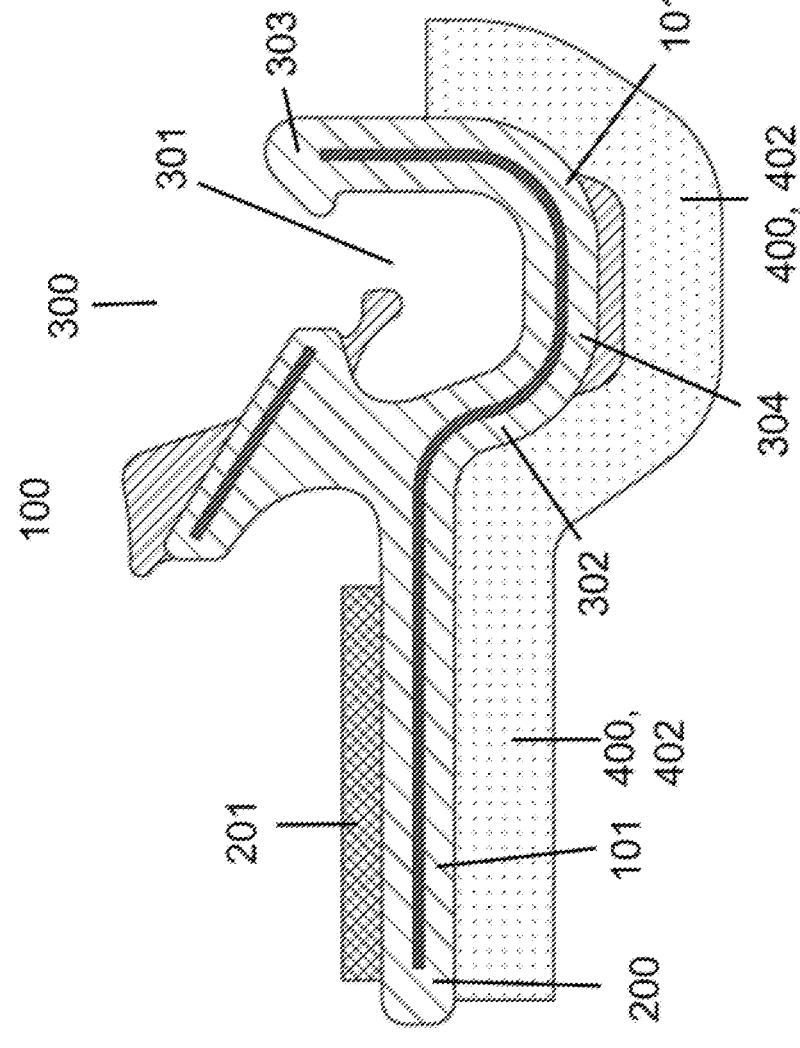
FIG. 4 is a profiled strip in an another embodiment having a water drainage element in the form of an additional part.

FIG. 4 shows a water drainage element (400) in the form of an additional part (401) which is made of a preferably water-repellent or water-impervious foam material (402). When viewed in cross section, it extends both along a portion of the outside of latching portion (300) and along a portion of the underside of attachment portion (200).

Figure 5:
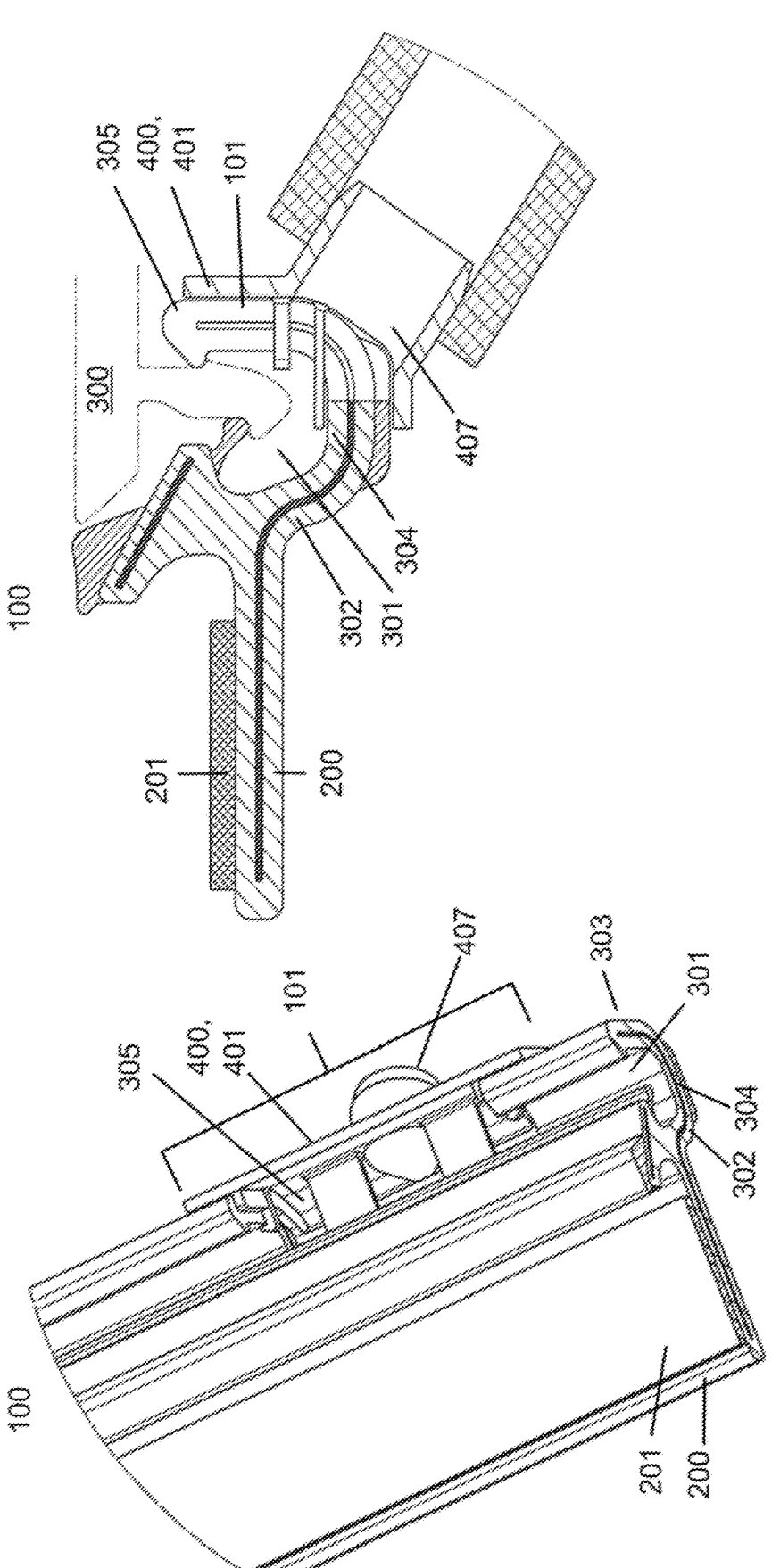
FIG. 5 is a profiled strip in an another embodiment having a water drainage element in the form of an additional part.

FIG. 5 shows a water drainage element (400) in the form of an additional part (401) which covers a local opening (305) in latching portion (300). The opening (305) provided in outer leg (303) and in a portion of bottom portion (304) is covered by additional part (401). Additional part (401) additionally has an outlet opening (407) fluidically connected to the latching groove. This serves to additionally drain liquid present in latching groove (301). Optionally, a seal may be provided which, after additional part (401) is mounted, substantially surrounds opening (305).

Figure 6A:
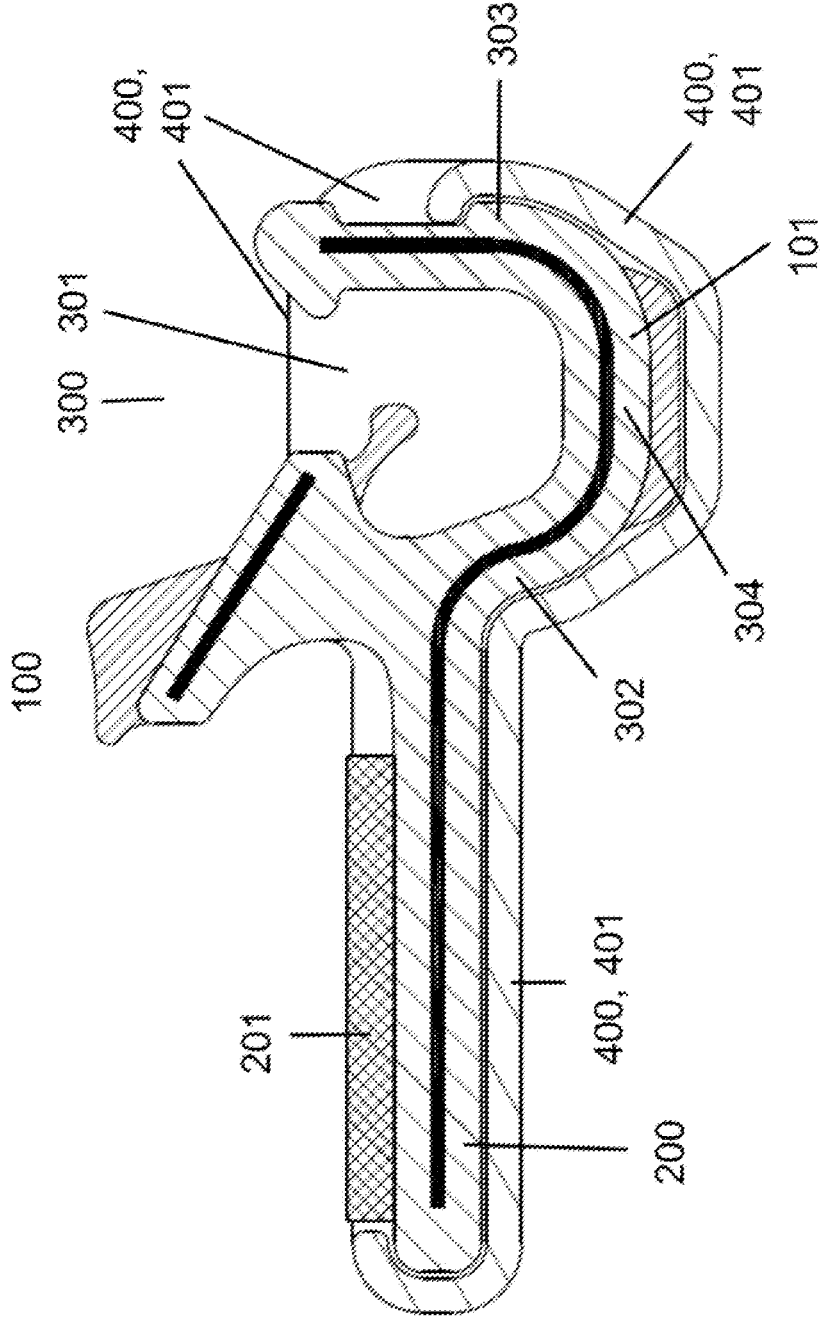
FIGS. 6a through 6c are a profiled strip in an another embodiment having a water drainage element in the form of an additional part.
Figure 6C:
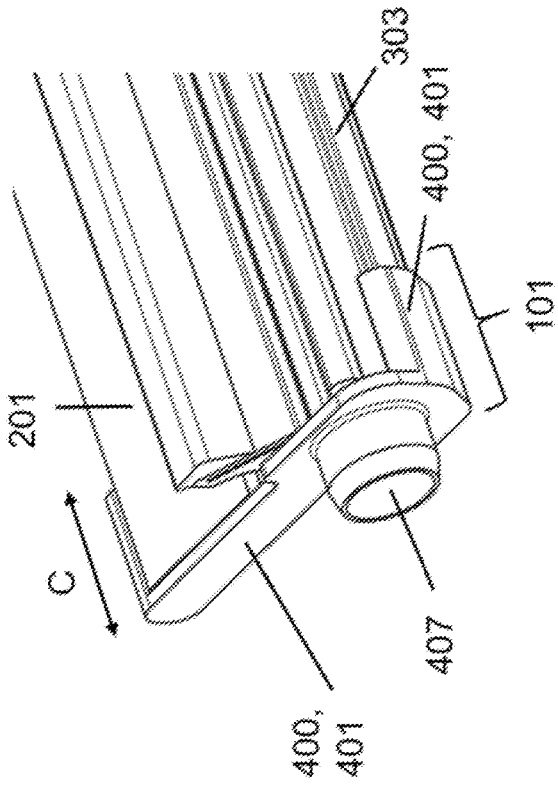
Figure 6B:
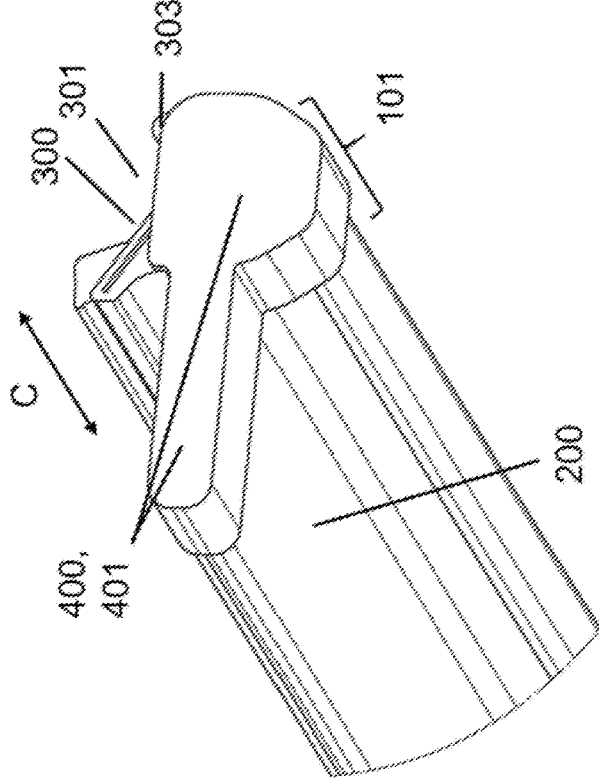

FIGS. 6a through 6c show a water drainage element (400) in the form of an additional part (401) which is disposed in the region of section (101) at an end face of latching portion (300); i.e., in the region of an end of profiled strip (100) delimiting the longitudinal extent of profiled strip (100). When viewed in cross section, additional part (401) extends both along a portion of the outside of latching portion (300) and along the underside of attachment portion (200), thus preventing, in particular, ingress of water into latching groove (301). As illustrated in FIG. 6c, additional part (401) may additionally be provided with an outlet opening (407) fluidically connected to the latching groove.

Figure 7B:
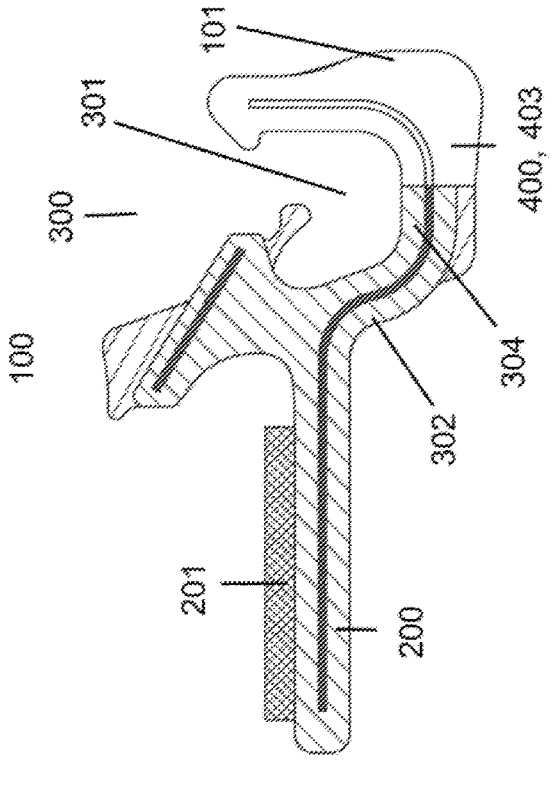
FIGS. 7a, 7b are a profiled strip in an another embodiment having a water drainage element in the form of a drain opening.
Figure 7A:
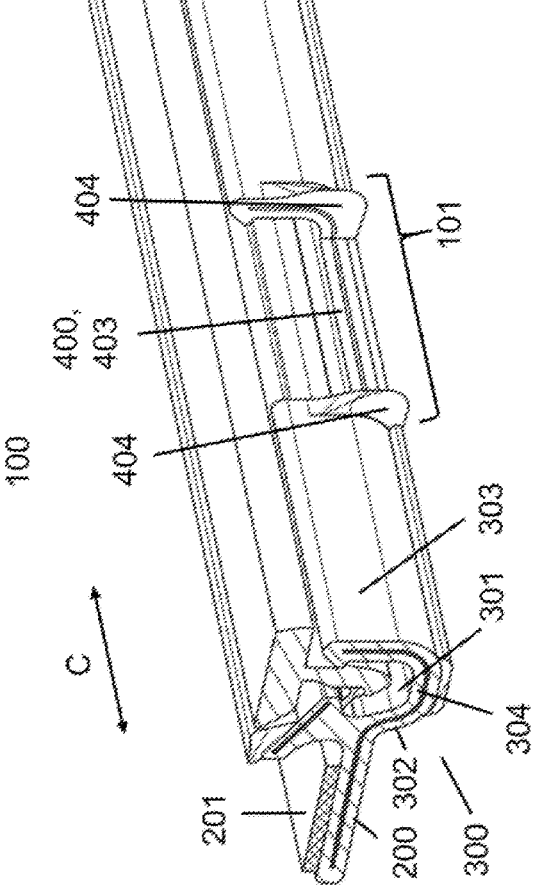

FIGS. 7a and 7b show a water drainage element (400) as an integral part of profiled strip (100) in the region of the section (101). In this example, outer leg (303) has a water drainage element (400) in the form of a drain opening (403) in the region of section (101). This drain opening (403) is formed in outer leg (303) and a portion of bottom portion (304). As shown in FIG. 7a, drip edges (404) are provided on the boundary of drain opening (403) in regions which are located opposite each other in longitudinal direction (C) of profiled strip (100), the drip edges (404) being oriented transverse to longitudinal direction (C). Drip edges (404) project outwardly with respect to latching groove (301) and allow water to drip off in a controlled manner at this position of profiled strip (100).

FIG. 8 shows, in the region of section (101), a water drainage element (400) in the region of section (101), which water drainage element (400) is in the form of a material thickening (405) on the outside of latching portion (300), the material thickening (405) being directed outwardly with respect to latching groove (301). Here, as shown in section A-A, material thickening (405) concerns outer leg (303), inner leg (302), and bottom portion (304). This thickening (405) is provided only in a region of latching portion (300) of profiled strip (100) which region forms the water drainage element (400), while outside this region, profiled strip (100) has a cross-sectional profile as shown in section B-B.

FIG. 9 shows a water drainage element (400) in the region of section (101), which water drainage element (400) is in the form of a recess (406) in the outside of the latching portion (300), which recess (406) is indented inwardly with respect to latching groove (301). Recess (406) concerns outer leg (303), inner leg (302), and bottom portion (304), and is provided only in a region of latching portion (300) of profiled strip (100) which region forms the water drainage element (400) (see section A-A), while outside this region, profiled strip (100) has a cross-sectional profile as shown in section B-B.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 100 profiled strip
101 section of the profiled strip
200 attachment portion
201 fastening means
300 latching portion
301 latching groove
302 inner leg
303 outer leg
304 bottom portion
305 opening
400 water drainage element
401 additional part (as the water drainage element)
402 foam material (as the water drainage element)
403 drain opening (as the water drainage element)
404 drip edge
405 outwardly directed material thickening (as the water drainage element)

406 inwardly indented recess (as the water drainage element)
407 drain opening
C longitudinal direction

The invention claimed is:
1. A profiled strip for connecting a windshield of a motor vehicle to a cowl plenum cover, the profiled strip comprising:
an attachment portion which is connectable to the windshield and has an attachment side facing the windshield and an underside facing away from the windshield;
a latching portion having a latching groove configured to latchingly receive a rib of the cowl plenum cover and having an outside facing away from the latching groove, the latching groove being bounded by an inner leg adjacent the attachment portion, an outer leg opposite the inner leg, and a bottom portion connecting the inner and outer legs; and
a water drainage element which is disposed on the latching portion in a section along a longitudinal extent of the profiled strip, wherein a longitudinal extent of the section and of the water drainage element as measured parallel to a longitudinal direction of the profiled strip is less than the longitudinal extent of the profiled strip.
2. A profiled strip for connecting a windshield of a motor vehicle to a cowl plenum cover, the profiled strip comprising:
an attachment portion which is connectable to the windshield and has an attachment side facing the windshield and an underside facing away from the windshield;
a latching portion having a latching groove configured to latchingly receive a rib of the cowl plenum cover and having an outside facing away from the latching groove, the latching groove being bounded by an inner leg adjacent the attachment portion, an outer leg opposite the inner leg, and a bottom portion connecting the inner and outer legs; and
a water drainage element which is disposed on the latching portion in a section along a longitudinal extent of the profiled strip, wherein the water drainage element is configured as an additional part disposed in a region of the section at least on a portion of the outside of the latching portion.
3. The profiled strip as recited in claim 2, wherein the additional part embraces at least a portion of the latching portion, when viewed in cross section.
4. The profiled strip as recited in claim 3, wherein the additional part extends over at least a portion of the underside of the attachment portion, when viewed in cross section.
5. The profiled strip as recited in claim 2, wherein the additional part has a substantially uniform cross-sectional profile along a longitudinal extent of the additional part.
6. The profiled strip as recited in claim 2, wherein the additional part has a variable cross-sectional profile along a longitudinal extent of the additional part.
7. The profiled strip as recited in claim 2, wherein the additional part is at least partially formed from a foam material.
8. The profiled strip as recited in claim 2, wherein the additional part at least partially covers an opening disposed in the bottom portion and/or in the outer leg.
9. The profiled strip as recited in claim 2, wherein the additional part is disposed on the profiled strip at an end face of the latching portion and at least partially covers the latching groove, when viewed in cross section.

10. The profiled strip as recited in claim 9, wherein the additional part has an outlet opening fluidically connected to the latching groove.

11. A profiled strip for connecting a windshield of a motor vehicle to a cowl plenum cover, the profiled strip comprising:

an attachment portion which is connectable to the windshield and has an attachment side facing the windshield and an underside facing away from the windshield;

a latching portion having a latching groove configured to latchingly receive a rib of the cowl plenum cover and having an outside facing away from the latching groove, the latching groove being bounded by an inner leg adjacent the attachment portion, an outer leg opposite the inner leg, and a bottom portion connecting the inner and outer legs; and a water drainage element which is disposed on the latching portion in a section along a longitudinal extent of the profiled strip, wherein the water drainage element is configured as a drain opening provided in the region of the section in the bottom portion and/or in the outer leg.

12. The profiled strip as recited in claim 11, wherein at least a portion of an edge bounding the drain opening has a drip edge projecting from the outside of the latching portion outwardly with respect to the latching groove.

13. The profiled strip as recited in claim 1, wherein the water drainage element is configured as a material thickening which is disposed in a region of the section on the outside of the latching portion on the bottom portion and/or on the outer leg and projects outwardly with respect to the latching groove.

14. The profiled strip as recited in claim 1, wherein the water drainage element is configured as a recess which is disposed in a region of the section on the outside of the latching portion on the bottom portion and/or on the outer leg and is indented inwardly with respect to the latching groove.

15. The profiled strip as recited in claim 7, wherein the foam material is water-repellant or water-impervious.

16. The profiled strip as recited in claim 8, wherein the additional part has an outlet opening fluidically connected to the latching groove.

17. The profiled strip as recited in claim 2, wherein the additional part extends over at least the bottom portion on the outside of the latching portion, when viewed in cross section.

18. The profiled strip as recited in claim 17, wherein the additional part extends over at least a portion of the outer leg, when viewed in cross section.

19. The profiled strip as recited in claim 18, wherein the additional part engages on the outside of the latching portion at the outer leg on one side and at the inner leg or the attachment portion on the other side, when viewed in cross section.

* * * * *